(12) United States Patent
Hübner et al.

(10) Patent No.: US 10,202,084 B2
(45) Date of Patent: Feb. 12, 2019

(54) SYSTEM FOR FASTENING A DOOR MODULE TO A CAR DOOR

(71) Applicant: ILLINOIS TOOL WORKS INC., Glenview, IL (US)

(72) Inventors: Manuel Hübner, Aub (DE); Isaac Tejero Salinero, Molins de Rei (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/567,230

(22) PCT Filed: Mar. 31, 2016

(86) PCT No.: PCT/US2016/025240
§ 371 (c)(1),
(2) Date: Oct. 17, 2017

(87) PCT Pub. No.: WO2016/171863
PCT Pub. Date: Oct. 27, 2016

(65) Prior Publication Data
US 2018/0148003 A1   May 31, 2018

(30) Foreign Application Priority Data
Apr. 22, 2015  (DE) .................. 10 2015 106 223

(51) Int. Cl.
*B60R 13/02*   (2006.01)
*F16B 21/07*   (2006.01)
(Continued)

(52) U.S. Cl.
CPC ...... *B60R 13/0206* (2013.01); *B60R 13/0243* (2013.01); *F16B 21/075* (2013.01); *F16B 5/0642* (2013.01); *F16B 19/1081* (2013.01)

(58) Field of Classification Search
CPC ............ B60R 13/0206; B60R 13/0243; B60R 5/0468; F16B 21/075; F16B 21/08;
(Continued)

(56) References Cited

U.S. PATENT DOCUMENTS 4,865,505 A * 9/1989 Okada ................... B60N 3/046
411/512
7,234,209 B2 * 6/2007 Totani ................... B60N 3/023
24/295

(Continued)

OTHER PUBLICATIONS

PCT, International Search Report and Written Opinion, International Application No. PCT/US2016/025240; dated Jun. 14, 2016, 11 pages.

*Primary Examiner* — Dennis H Pedder
(74) *Attorney, Agent, or Firm* — Thompson Hine LLP

(57) ABSTRACT

A car fastening system includes a metal clip and a plastics locking body. When an insertion portion of the metal clip is completely inserted into a door module opening, at least two supporting tabs rest on an upper side of the door module and at least two first latching legs engage behind the opening. The insertion portion of the metal clip forms a receptacle for the plastics locking body. By insertion of the plastics locking body into the receptacle, at least two second latching legs are pressed elastically outwards out of an inoperative position such that the latching legs engage behind an opening in the car door. When the plastics locking body is completely inserted into the receptacle, a shifting movement of the second latching legs in order to release the engagement behind the opening in the car door is blocked by the plastics locking body.

14 Claims, 3 Drawing Sheets

Figure 1:
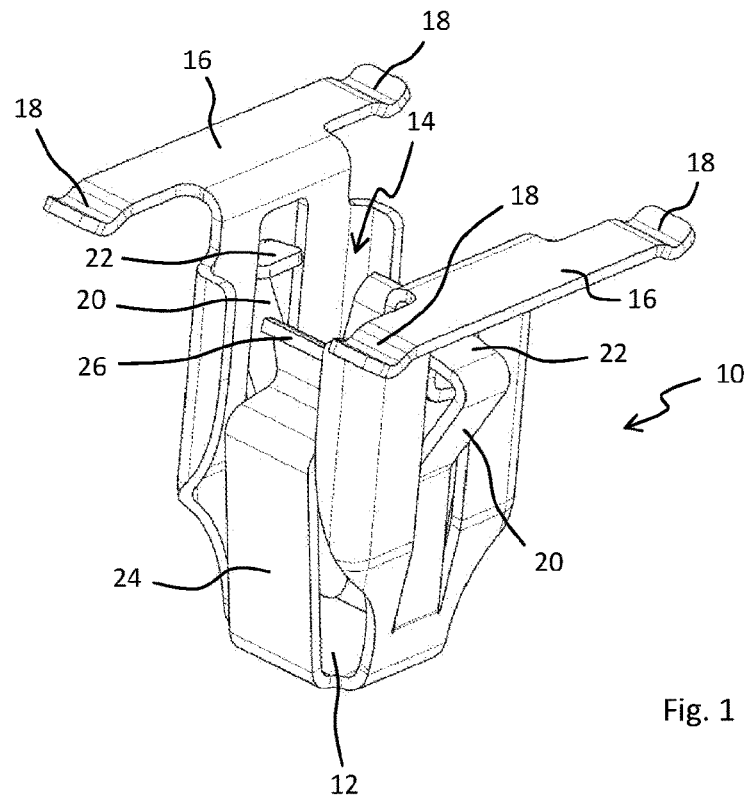

(51) Int. Cl.
*F16B 5/06* (2006.01)
*F16B 19/10* (2006.01)

(58) Field of Classification Search
CPC .... F16B 21/082; F16B 21/084; F16B 21/086;
F16B 19/1081; F16B 5/0642; Y10T
24/303; Y10T 24/304; Y10T 24/306;
Y10T 24/307; Y10T 24/45; Y10T
24/45005; Y10T 24/45105
USPC ...... 296/146.7, 39.1, 191, 1.08; 24/292–295,
24/297; 49/501–503
See application file for complete search history.

(56) References Cited

U.S. PATENT DOCUMENTS

| | | | | |
|---|---|---|---|---|
| 7,481,474 | B2* | 1/2009 | Higgins | F16B 21/086 24/292 |
| 8,496,420 | B2* | 7/2013 | Aoki | F16B 5/0642 411/45 |
| 8,636,454 | B2* | 1/2014 | Okada | F16B 5/0642 24/295 |
| 2005/0248167 | A1* | 11/2005 | Totani | B60N 3/023 296/1.02 |
| 2006/0066080 | A1 | 3/2006 | Ikeda | |
| 2010/0303539 | A1* | 12/2010 | Aoki | F16B 5/0642 403/291 |

* cited by examiner

SYSTEM FOR FASTENING A DOOR MODULE TO A CAR DOOR

The invention relates to a system for fastening a door module to a car door. Door modules are conventionally fastened to the car door by means of a rivet connection or screw connection. A rivet connection cannot be released, which is frequently disadvantageous. A screw connection requires a complicated installation.

Starting from the prior art explained, the invention is based on the object of providing a system of the type mentioned at the beginning which ensures high holding forces during operation while installation and removal are straightforward.

The invention achieves the object by means of the subject matter of claim 1. Advantageous refinements are found in the dependent claims, the description and the figures.

The invention achieves the object by a system for fastening a door module to a car door, comprising a metal clip and a plastics locking body, wherein the metal clip is insertable with an insertion portion into an opening in the door module and into an opening in the car door, wherein at least two supporting tabs are formed at one end of the insertion portion and, when the insertion portion is completely inserted into the door module, rest on an upper side of the door module, wherein the metal clip furthermore has at least two first latching legs which are connected in a resiliently elastic manner opposite each other to the insertion portion and, when the insertion portion is completely inserted into the door module, engage behind the opening in the door module on the lower side of the door module, which lower side faces away from the supporting tabs, wherein the metal clip furthermore has at least two second latching legs which are likewise arranged in a resiliently elastic manner opposite each other on the insertion portion, wherein the insertion portion of the metal clip furthermore forms a receptacle for the plastics locking body, wherein, by insertion of the plastics locking body into the receptacle, the second latching legs are pressed elastically outwards out of the inoperative position thereof such that said latching legs engage behind the opening in the car door on the lower side of the car door, which lower side faces away from the supporting tabs, and, when the plastics locking body is completely inserted into the receptacle, a shifting movement of the second latching legs in order to release the engagement behind the opening in the car door is blocked by the plastics locking body.

The door module to be fastened with the system to the car door, which is composed, for example, of metal, can hold, for example, speakers or motors for electric power windows of the car. However, the door module may also be a door panel. The door panel can optionally hold or have a door inside handle, for example. Door panels are conventionally fastened with plastic clips and additionally with screws. The latter serve in particular for securing purposes in the event of a side impact. The invention, as a corresponding functional clip, can replace said screws and/or, in a variation, can serve as a more efficient door clip. The system according to the invention comprises a metal clip and a plastics locking body. The metal clip is designed in particular integrally, for example is shaped from a metal sheet by punching out and bending over. The plastics locking body is in particular likewise designed integrally, for example is produced by a plastics injection-molding method.

The metal clip comprises first resiliently elastic latching legs which, when the metal clip is completely inserted in the opening in the door module, engage behind the opening in the door module on the lower side. In particular, the first latching legs are elastically deflected inward from the inoperative position thereof during the course of the insertion into the (cross-sectionally smaller) opening and, after passing completely through the opening in the door module, move outward again into the inoperative position thereof, wherein the first latching legs engage behind the opening in the door module. Therefore, the first latching legs, in the inoperative state thereof, form a larger cross section than the opening into which the metal clip is inserted by the first latching legs.

The metal clip is inserted by the insertion portion thereof, with a first end of the insertion portion in front, into the opening in the door module. At least two supporting tabs are formed at that end of the insertion portion which is opposite said first end, said supporting tabs resting on the upper side of the door module during the insertion of the insertion portion into the door module and thus forming an abutment for absorbing tensile forces on the system in the mounted state. Said supporting tabs together with the second latching legs explained below provide the required holding forces of the system.

As already mentioned, the metal clip furthermore has at least two resiliently elastic latching legs which are likewise arranged opposite each other on the insertion portion. During the complete insertion of the insertion portion into the openings in the door module and the car door, the second latching legs pass through the openings in the door module and in the car door. While the first latching legs are deflected out of the inoperative position thereof, in particular are compressed, as they pass through the opening in the door module, the second latching legs can enter in the inoperative position thereof through the opening (which is sufficiently large in cross section) in the car door without elastic deformation. Therefore, the second latching legs, in the inoperative state thereof, do not form a larger cross section than the openings into which the metal clip is inserted by the second latching legs. Only by insertion of the plastics locking body into the receptacle of the metal clip are the second latching legs pressed elastically outward out of the inoperative position thereof such that said latching legs then engage behind the opening in the car door, and release of the metal clip from the car door, and therefore release of the door module from the car door, is impossible.

The installation can take place in a simple manner merely by pressing the metal clip and the plastics locking body into the openings of door module and car door. In a corresponding manner, during removal of the plastics locking body from the receptacle of the metal clip and an associated shifting movement of the second latching legs into the inoperative position thereof, release of the metal clip, and therefore of the door module, from the car door is possible in a simple manner. Both the installation and the removal are simplified in comparison to the prior art.

The metal clip substantially provides the entire holding function and holding force during operation. A particularly high holding force is achieved by said clip being formed from a metal material. The plastics locking body serves merely to lock the metal clip to the car door by locking the second latching legs or to release said lock again for removal. Said plastics locking body can therefore be produced in a cost-effective and weight-saving manner from a plastic with less load-bearing capacity.

According to a refinement, when the insertion portion is completely inserted into the door module, the supporting tabs can interact with positioning elements which are formed on the upper side of the door module and are intended for positioning the metal clip. The supporting tabs thus bring the metal clip into a defined position, in particular said supporting tabs center the metal clip with respect to the opening in the door module. The supporting tabs can be elastic, wherein the positioning elements are positioning depressions which are formed on the upper side of the door module, which upper side faces away from the car door in the mounted position, in which the supporting tabs are accommodated in a latching manner by positioning portions formed at the free ends of the supporting tabs. The supporting tabs can be connected opposite one another to the end of the insertion portion of the metal clip. For even better positioning, the supporting tabs can each have two positioning portions which are formed at mutually opposite, free ends and each interact with a positioning depression. The supporting tabs therefore then each have two free ends. They can each be connected centrally between the free ends thereof to the insertion portion. There are therefore then at least four positioning depressions in which in each case one of at least four positioning portions engages.

According to a further refinement, it can be provided that the first latching legs each extend in the direction of the supporting tabs from a connection at that end of the insertion portion which faces away from the supporting tabs, wherein a bent-over latching portion is formed at each of the free ends of the first latching legs, wherein, when the insertion portion is completely inserted into the door module, the bent-over latching portions bear against the lower side of the door module.

According to a further refinement, it can be provided that the second latching legs each extend in the direction of the supporting tabs from a connection at that end of the insertion portion which faces away from the supporting tabs, wherein a bent-over latching portion is formed at each of the free ends of the second latching legs, wherein, when the plastics locking body is completely inserted into the receptacle, the bent-over latching portions bear against the lower side of the car door.

According to a further refinement, it can be provided that the plastics locking body has a head portion and a locking portion which extends from the head portion and is insertable into the receptacle of the insertion portion of the metal clip.

According to a further refinement, it can be provided that the locking portion has at least two mutually opposite first latching depressions in which, when the locking portion is completely inserted into the receptacle, the second latching legs of the metal clip are accommodated in a latching manner such that, in said final installation state, the plastics locking body is held releasably on the metal clip. This secures the plastics locking body against unintentional release from the metal clip and therefore against unintentional removal.

According to a further refinement, it can be provided that the locking portion has, between the first latching depressions and its free end, at least two mutually opposite second latching depressions in which, when the locking portion is partially inserted into the receptacle, the second latching legs of the metal clip are accommodated such that, in this preassembly state, the plastics locking body is held releasably on the metal clip. This permits a preassembly position in which, although the plastics locking body is held (releasably) on the metal clip, the second latching legs have not yet been expanded by the plastics locking body. The metal clip and the plastics locking body can be delivered in this preassembly position to the customer, and the metal clip and the plastics locking body can be inserted in said preassembly position into the door module and the car door.

According to a further refinement, it can be provided that the second latching depressions each merge via a ramp portion, which enlarges the cross section of the locking portion in the direction of the first latching depressions, into the first latching depressions, which spring back in relation to the ramp portion, and therefore the plastics locking body, in the state not completely inserted into the insertion portion, is moved back via the ramp portions into the preassembly state. The ramps lead from the second latching depressions to the first latching depressions. The first latching depression springs back inward in each case at least in relation to that end portion of the ramps which faces the first latching depression, and therefore the second latching legs have to overcome the ramps from the second latching depressions as far as the end in order to pass into the first latching depressions and to latch there. If the plastics locking body is not completely inserted into the metal clip and, consequently, the second latching legs do not completely overcome the ramps, the second latching legs are guided back via the ramps into the second latching depressions, and therefore the plastics locking body is guided back into the preassembly position in the metal clip. Therefore, an inadvertent incomplete installation which could lead to an unintentional release of the system during operation is reliably avoided. The ramps can in particular in each case continuously increase the cross section. They can form in cross section a cross section which widens conically from the second latching depressions in the direction of the first latching depressions.

The head portion can have, on the outer edge thereof, an encircling sealing portion which, when the door module is fastened to the car door, bears against the upper side of the door module in a sealing manner. The sealing portion or sealing ring can be injection-molded onto the plastics locking body, for example in a two-component injection-molding process.

The head portion of the plastics locking body can furthermore have an engagement portion in which, for removal purposes, a tool for removing the plastics locking body from the insertion portion of the metal clip can engage, for example for pulling out the plastics locking body.

The system according to the invention can furthermore comprise the door module and the car door. The opening in the door module and/or the opening in the car door may be an elongated hole. The longitudinal axes of the elongated holes can run transversely with respect to each other in the mounted state. The first latching legs can be arranged lying opposite each other along a first axis on the outer side of the insertion portion, and the second latching legs can be arranged lying opposite each other along a second axis running perpendicular to the first axis on the outer side of the insertion portion. This arrangement of the latching legs is taken into account by the above-mentioned refinement.

According to a further refinement, it can be provided that the door module has, in a region about the opening therein, on the lower side thereof which, in the mounted state, faces the car door, a depression which, when the door module is fastened to the car door, forms a clearance between the door module and the car door, in which the latching portions of the first latching legs are accommodated when the insertion portion is completely inserted into the door module and into the car door.

Figure 2:
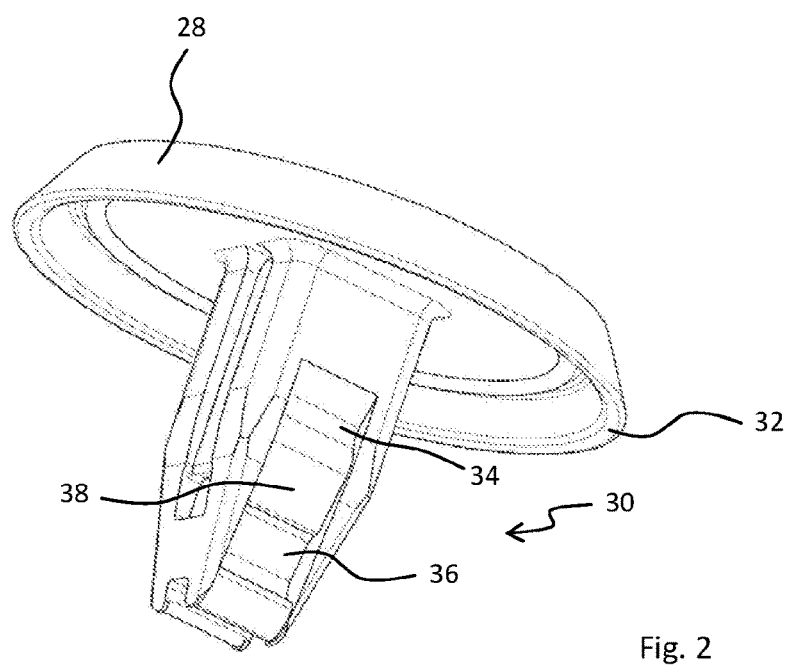
Figure 3:
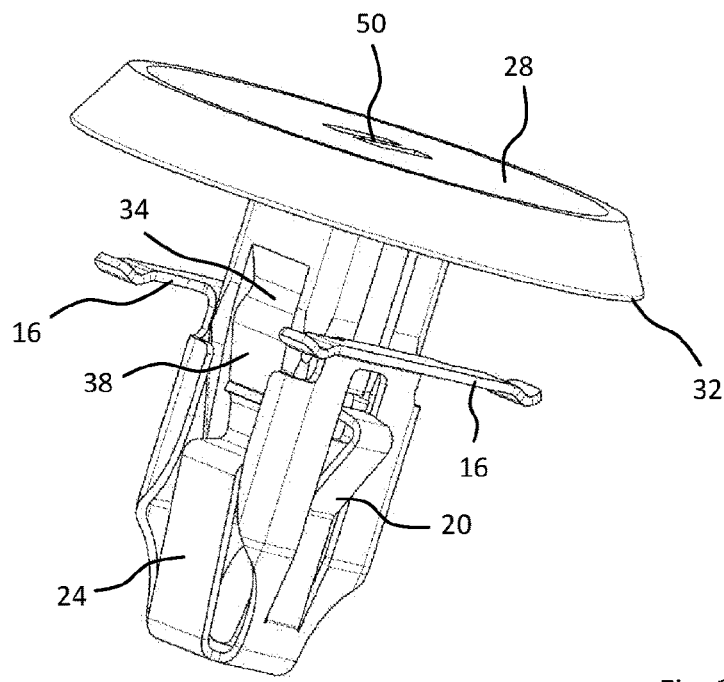
Figure 4:
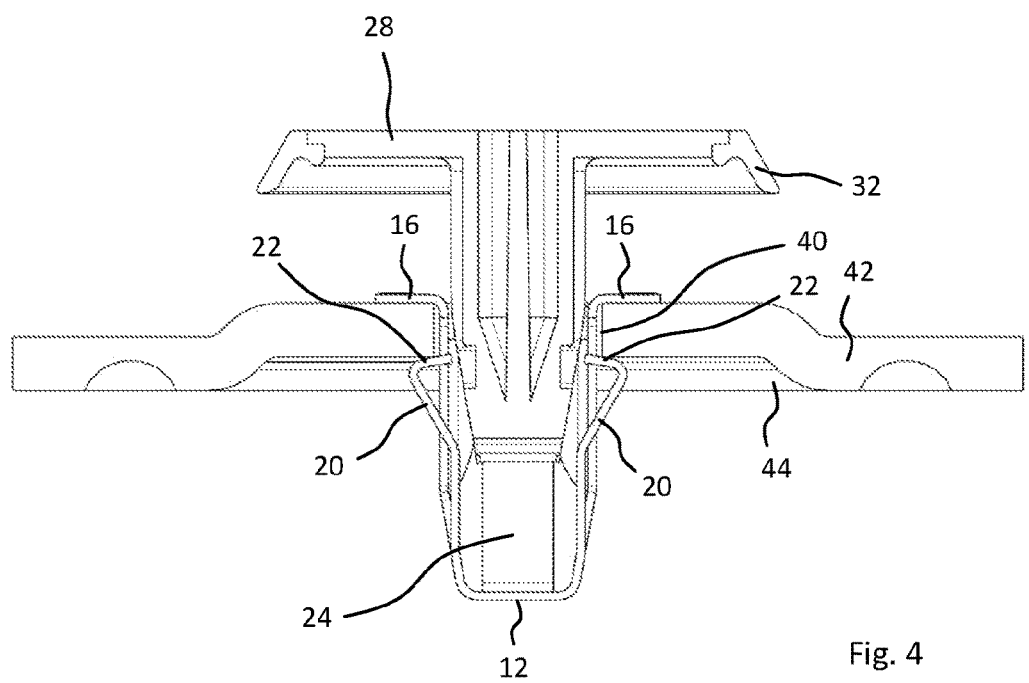
Figure 5:
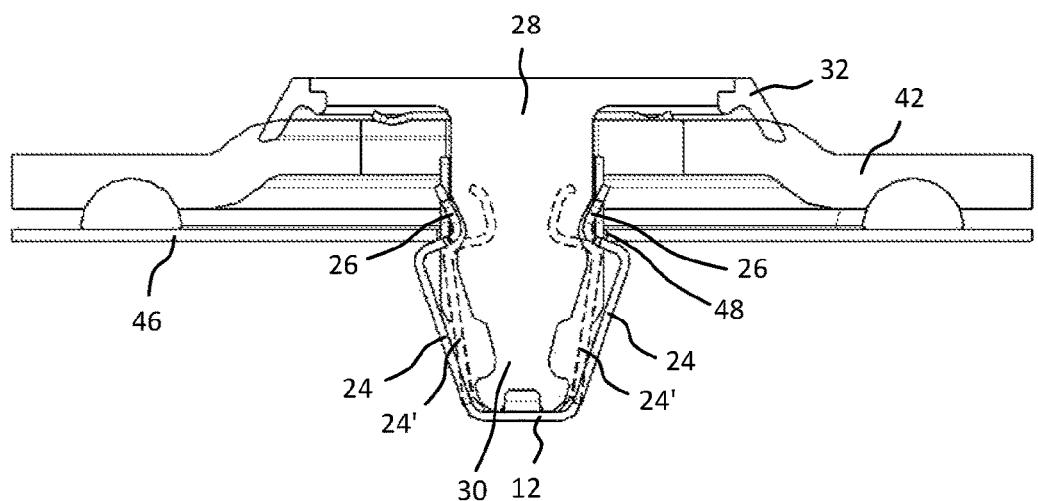

An exemplary embodiment of the invention is explained in more detail below with reference to figures, in which, schematically:

FIG. 1 shows a metal clip of a system according to the invention in a perspective view, FIG. 2 shows a plastics locking body of a system according to the invention in a perspective view, FIG. 3 shows the metal clip from FIG. 1 and the plastics locking body from FIG. 2 in a preassembly state in a perspective view, FIG. 4 shows the metal clip and the plastics locking body in the preassembly state from FIG. 3 in the state inserted into a door module, in a cross-sectional view, and FIG. 5 shows the metal clip and the plastics locking body from FIG. 4 in a final installation state inserted into the door module and the car door, in a cross-sectional view rotated by 90° in relation to FIG. 4.

Unless stated otherwise, the same reference numbers denote the same objects in the figures. The metal clip shown in FIG. 1 is of integral design and has been produced from a metal sheet by punching out and deforming. Said metal clip has an insertion portion 10 with a base 12 at the one end thereof. An entry opening for a receptacle 14 for the plastics locking body shown in FIG. 2 is formed at the end opposite the base 12. In addition, two supporting tabs 16 which are each connected lying opposite each other centrally to a wall of the receptacle 14 and which each have two mutually opposite, free ends, are located at said end of the insertion portion 10, wherein a respective bead 18 is formed at the free ends. Furthermore, two mutually opposite, resiliently elastic first latching legs are formed in the region of two opposite outer sides of the receptacle 14. The first latching legs 20 each have a bent-over latching portion 22 at the free ends thereof. Furthermore, two mutually opposite, second, resiliently elastic latching legs 24, at the free ends of which a respective latching portion 26 is likewise formed, are formed on two mutually opposite outer sides of the receptacle 14.

FIG. 2 shows a plastics locking body of the system according to the invention, said plastics locking body having a head portion 28 and a locking portion 30 extending from the head portion 28. The head portion 28 has an encircling sealing portion 32 at the outer edge thereof. The locking body 30 tapers in the direction of the free end thereof and comprises two first latching depressions which are formed on mutually opposite outer sides of the locking portion 30 and of which only one can be seen in FIG. 2 at the reference number 34. Furthermore, the locking portion 30 has, between the first latching depressions 34 and its free end, two second latching depressions 36 which are likewise formed opposite each other in the mutually opposite walls. Again, only one of the second latching depressions 36 can be seen in FIG. 2. The second latching depressions 36 each merge via a ramp portion 38, which enlarges the cross section of the locking portion in the direction of the first latching depressions 34, into the first latching depressions 34, which spring back at least in relation to that end of the respective ramp portion which faces them.

In order to reach the preassembly position shown in FIG. 3, the plastics locking body is partially inserted by the locking portion 30 thereof into the receptacle 14 of the metal clip, wherein the second latching legs 24 latch by the latching portions 26 thereof in the second latching depressions 36 of the locking portion 30. The plastics locking body is therefore held releasably in the metal clip in this preassembly position. The tapering of the locking portion 30 in the direction of the free end thereof and the second latching depressions 36 ensure that the second latching legs 24 continue to be in the inoperative position thereof in the preassembly state accommodated in the second latching depressions 36. In said preassembly state, the system consisting of plastics locking body and fastening clip can be inserted into an opening 40 in a door module 42, as FIG. 4 shows. During the insertion into the opening 40, the first latching legs 20 are first of all pressed inward out of the inoperative position thereof and, after passing completely through the opening 40, move outward again into the inoperative position thereof, wherein the first latching legs 20 engage by the latching portions 22 thereof behind the opening 40 on the lower side of the door module 42, as can readily be seen in FIG. 4. In addition, the beads 18 of the supporting tabs 16 enter into engagement with positioning depressions, which cannot be seen in FIG. 4, on the surface of the door module 42. This results in a defined positioning of the metal clip, and therefore of the plastics locking body, in the door module 42. In addition, it can be seen in FIG. 4 that the door module 42 has, in the region about the opening 40 therein, on the lower side thereof a depression 44 in which the latching portions 22 of the first latching legs 20 are accommodated.

Subsequently, the door module 42 can be fastened by the metal clip and the plastics locking body in the position shown in FIG. 4 to a car door 46, as shown in FIG. 5. The metal clip here is first of all brought with the insertion portion 10 thereof through a corresponding opening 48 in the car door 46. The second latching legs 24 first of all pass here without deflection from the inoperative position thereof through the opening 48 in the car door 46. Only when the plastics locking body is subsequently completely inserted by the locking portion 30 thereof into the receptacle 14 of the insertion portion of the metal clip are the second latching legs 24 pressed outward such that the latter engage by means of the latching portions 26 behind the opening 48 on the lower side of the car door 46, as illustrated in FIG. 5. In this state, the second latching legs 24 are blocked against shifting into the inoperative position thereof by the locking portion 30 of the plastics locking body, and therefore an unintentional release is not possible. In addition, it can be seen in FIG. 5 that the sealing portion 32 of the head portion 28 bears in a sealing manner on the surface of the door module 42.

For removal purposes, the plastics locking body can be removed in a simple manner from the receptacle 14 of the metal clip, and therefore the second latching legs 24 move back again into the inoperative position thereof, as shown in FIG. 5 by dashed lines for illustrative reasons at reference number 24'. Subsequently, the door module 42 can be released together with the metal clip and the plastics locking body from the car door 46. For the removal from the receptacle 14 of the metal clip, the plastics locking body has, on the head portion 28 thereof, an engagement portion 50 which can be seen in FIG. 3 and into which a suitable removal tool can engage.

It goes without saying that, in practice, the door module is generally fastened to the car door with a plurality of metal clips and plastics locking bodies.

The invention claimed is:

1. A system for fastening a door module (42) to a car door (46), comprising a metal clip and a plastics locking body, wherein the metal clip is insertable with an insertion portion (10) into an opening (40) in the door module (42) and into an opening (48) in the car door (46), wherein at least two supporting tabs (16) are formed at one end of the insertion portion (10) and, when the insertion portion (10) is completely inserted into the door module (42), rest on an upper side of the door module (42), wherein the metal clip furthermore has at least two first latching legs (20) which are connected in a resiliently elastic manner opposite each other to the insertion portion (10) and, when the insertion portion

(10) is completely inserted into the door module (42), engage behind the opening (40) in the door module (42) on the lower side of the door module (42), which lower side faces away from the supporting tabs (16), wherein the metal clip furthermore has at least two second latching legs (24) which are likewise arranged in a resiliently elastic manner opposite each other on the insertion portion (10), wherein the insertion portion (10) of the metal clip furthermore forms a receptacle (14) for the plastics locking body, wherein, by insertion of the plastics locking body into the receptacle (14), the second latching legs (24) are pressed elastically outwards out of the inoperative position thereof such that said second latching legs engage behind the opening (48) in the car door (46) on a side of the car door (46), which side faces away from the supporting tabs (16), and, when the plastics locking body is completely inserted into the receptacle (14), a shifting movement of the second latching legs (24) in order to release the engagement behind the opening (48) in the car door (46) is blocked by the plastics locking body.

2. The system as claimed in claim 1, characterized in that, when the insertion portion (10) is completely inserted into the door module (42), the supporting tabs (16) interact with positioning elements which are formed on the upper side of the door module (42) and are intended for positioning the metal clip.

3. The system as claimed in claim 2, characterized in that the supporting tabs (16) are elastic, and in that the positioning elements are positioning depressions which are formed on the upper side of the door module (42), which upper side faces away from the car door (46) in the mounted position, in which the supporting tabs (16) are accommodated in a latching manner by positioning portions formed at the free ends of the supporting tabs (16).

4. The system as claimed in claim 1, characterized in that the first latching legs (20) each extend in a direction of the supporting tabs (16) from a connection at that end of the insertion portion (10) which faces away from the supporting tabs (16), wherein a bent-over latching portion (22) is formed at each of the free ends of the first latching legs (20), wherein, when the insertion portion (10) is completely inserted into the door module (42), the bent-over latching portions (22) bear against the lower side of the door module (42).

5. The system as claimed in claim 1, characterized in that the second latching legs (24) each extend in a direction of the supporting tabs (16) from a connection at that end of the insertion portion (10) which faces away from the supporting tabs (16), wherein a bent-over latching portion (26) is formed at each of the free ends of the second latching legs (24), wherein, when the plastics locking body is completely inserted into the receptacle (14), the bent-over latching portions (26) bear against the lower side of the car body (46).

6. The system as claimed in claim 1, characterized in that the plastics locking body has a head portion (28) and a locking portion (30) which extends from the head portion (28) and is insertable into the receptacle (14) of the insertion portion (10) of the metal clip.

7. The system as claimed in claim 6, characterized in that the locking portion (30) has at least two mutually opposite first latching depressions (34) in which, when the locking portion (30) is completely inserted into the receptacle (14), the second latching legs (24) of the metal clip are accommodated in a latching manner such that, in said final installation state, the plastics locking body is held releasably on the metal clip.

8. The system as claimed in claim 7, characterized in that the locking portion (30) has, between the first latching depressions (34) and its free end, at least two mutually opposite second latching depressions (36) in which, when the locking portion (30) is partially inserted into the receptacle (14), the second latching legs (24) of the metal clip are accommodated such that, in this preassembly state, the plastics locking body is held releasably on the metal clip.

9. The system as claimed in claim 8, characterized in that the second latching depressions (36) each merge via a ramp portion (38), which enlarges the cross section of the locking portion (30) in the direction of the first latching depressions (34), into the first latching depressions (34), which spring back in relation to the ramp portion (38), and therefore the plastics locking body, in the state not completely inserted into the insertion portion (10), is moved back via the ramp portions (38) into the preassembly state.

10. The system as claimed in claim 6, characterized in that the head portion (28) has, on the outer edge thereof, an encircling sealing portion (32) which, when the door module (42) is fastened to the car door (46), bears against the upper side of the door module (42) in a sealing manner.

11. The system as claimed in claim 6, characterized in that the head portion (28) of the plastics locking body has an engagement portion (50) in which, for removal purposes, a tool for removing the plastics locking body from the insertion portion (10) of the metal clip can engage.

12. The system as claimed in claim 4, characterized in that the system furthermore comprises the door module (42) and the car door (46).

13. The system as claimed in claim 12, characterized in that the opening (40) in the door module (42) and/or the opening (48) in the car door (46) are/is an elongated hole.

14. The system as claimed in claim 12, characterized in that the door module (42) has, in a region about the opening (40) therein, on the lower side thereof which, in the mounted state, faces the car door (46), a depression (44) which, when the door module (42) is fastened to the car door (46), forms a clearance between the door module (42) and the car door (46), in which the latching portions (22) of the first latching legs (20) are accommodated when the insertion portion (10) is completely inserted into the door module (42) and into the car door (46).

* * * * *

UNITED STATES PATENT AND TRADEMARK OFFICE
CERTIFICATE OF CORRECTION

| | | |
|---|---|---|
| PATENT NO. | : 10,202,084 B2 | Page 1 of 1 |
| APPLICATION NO. | : 15/567230 | |
| DATED | : February 12, 2019 | |
| INVENTOR(S) | : Manuel Hübner and Isaac Tejero Salinero | |

It is certified that error appears in the above-identified patent and that said Letters Patent is hereby corrected as shown below:

In the Claims

In Claim 1, at Column 7, Line 12 reads:
"outwards out of the inoperative position"
It should read:
--outwards out of an inoperative position--

Signed and Sealed this
Sixteenth Day of April, 2019

Andrei Iancu
*Director of the United States Patent and Trademark Office*